United States Patent
Balakrishnan

Patent Number: 5,602,724
Date of Patent: Feb. 11, 1997

[54] LOW-COST, HIGH-VOLTAGE, FLYBACK POWER SUPPLY

[75] Inventor: Balu Balakrishnan, Saratoga, Calif.

[73] Assignee: Power Integrations, Inc., Sunnyvale, Calif.

[21] Appl. No.: 636,312

[22] Filed: Apr. 23, 1996

[51] Int. Cl.⁶ .......................... H02M 3/335; H02M 3/24; H02M 5/42; H02H 7/122
[52] U.S. Cl. ........................ 363/21; 363/56; 363/97
[58] Field of Search ............................ 363/16, 20, 21, 363/56, 97, 131, 18, 19, 55

[56] References Cited

U.S. PATENT DOCUMENTS

| | | | |
|---|---|---|---|
| 4,710,695 | 12/1987 | Yamada et al. | 363/21 |
| 4,937,728 | 6/1990 | Leonardi | 363/19 |
| 4,970,620 | 11/1990 | Lehnhoff et al. | 363/56 |
| 5,239,453 | 8/1993 | Remson | 363/19 |
| 5,404,287 | 4/1995 | Poumey | 363/21 |
| 5,506,764 | 4/1996 | Hon et al. | 363/21 |

*Primary Examiner*—Robert Nappi
*Assistant Examiner*—Bao Q. Vu
*Attorney, Agent, or Firm*—Lyon & Lyon

[57] ABSTRACT

A low-cost, high-voltage, flyback power supply comprising two switching transistors connected in series with the primary winding of the transformer. Such a power supply also comprises a clamping circuit in parallel with the primary of the transformer.

15 Claims, 2 Drawing Sheets

LOW-COST, HIGH-VOLTAGE, FLYBACK POWER SUPPLY

FIELD OF THE INVENTION

The present invention relates to power supply circuitry and more specifically to low-cost, high-voltage flyback power supply circuitry.

BACKGROUND OF THE INVENTION

Flyback power supplies are a prior art switching-type power supply. They are simple, efficient, small, lightweight and cost effective. However, at high voltages, the cost of the components installed therein can reduce this type of power supply's cost effectiveness. To show how the cost effectiveness is reduced as the line voltage increases, reference is made to FIG. 1, which shows a typical high-voltage flyback power supply 10 of the prior art.

Alternating current ("AC") main, or line, power is supplied to the power supply from an external source. Industrial applications generally utilize a main power source of four hundred and forty (440) AC volts ("VAC"). This signal is rectified by full wave rectifier 12 and filtered by filter capacitor 14. This rectification and filtering translates the 440 VAC into a nominal direct current voltage of six hundred and twenty-five (625) volts ("VDC"). While the power supply 10 must be designed to handle peak input voltages significantly higher than 625 VDC because line voltage fluctuations and transients in industrial main lines can lead to worst case maximum voltages as high as eight hundred (800) VDC. This voltage is known as the "input voltage". These voltage fluctuations and transients are quite common in industrial environments and can be caused by such occurrences as the turning on or off of a piece of machinery supplied by the AC main.

Power supply 10 also comprises clamping circuit 16, which comprises Zener diodes 22 and 24 and diode 26. In exemplary prior art high voltage power supplies 10, each Zener diode 22 and 24 typically has a zener voltage of two hundred (200) volts. Clamping circuit 16 is used to limit the sum of the reflected voltage of the primary and the voltage spike caused by the inherent leakage inductance of the primary winding 19 of the output transformer 18 to a certain voltage. This reflected voltage and voltage spike will be discussed below. Secondary winding 20 is connected to diode 28 and capacitor 30 in series circuit configuration. The output 31 of the power supply 10 is across capacitor 30.

The output 31 is connected to a sense circuit 32. The output of sense circuit 32 can be connected to the input of an isolation circuit 33. Isolation circuit 33 is only present in those power supplies 10 where output 31 needs to be isolated from the AC main. If an isolation circuit 33 is present, its output is connected to a pulse width modulation controller 34. If an isolation circuit 33 is not present, the output of the sense circuit 32 is connected to the pulse width modulation controller 34. The output of the pulse width modulation controller 34 is connected to the gate of flyback switching transistor 36, which is a n-type metal oxide semiconductor field effect transistor (MOSFET).

In prior art power supply 10, the switching transistor 36 must be rated for a very high drain-source breakdown voltage because it will be exposed to very high voltages. When the switching transistor 36 is turned on, diode 26 is reversed biased, and the line voltage from the positive direct current ("DC") rail is applied to the primary winding 19, thereby ramping up its current.

When the switching transistor 36 turns off, the voltage across the primary 19 reverses so that the transformer 18 can deliver its current to the secondary 20. This reversal of the primary 19 voltage is due to the voltage reflected from the secondary 20 when the secondary 20 is conducting current. This is known as "reflected voltage". With reference to the drain of transistor 36, this reflected voltage adds to the input voltage. The input voltage can be as high as 800 VDC, as explained earlier. The magnitude of the reflected voltage can be controlled by adjusting the winding ratio of the transformer 18, i.e., the ratio of the number of windings in the primary 19 versus the number of windings in the secondary 20. Generally, the winding ratio is selected such that the reflected voltage of the primary 19 is limited to 300 VDC.

When switching transistor 36 turns off, most of the energy in the transformer 18 is delivered to the secondary 20. However, the energy stored in the leakage inductance of the primary 19 causes a spike in the reflected voltage, which is delivered to Zener diodes 24 and 22 through diode 26. This voltage spike caused by the leakage inductance of the primary 19 results in the primary 19 voltage rising well above 300 VDC for a short period of time, thereby forward biasing the diode 26. If the reflected voltage plus the voltage spike from the leakage inductance of the primary 19 becomes high enough, Zener diodes 22 and 24 will enter their breakdown region. In general, the voltage spike caused by the leakage inductance of the primary 19 will be large enough to put Zener diodes 22 and 24 into their breakdown region. Since Zener diodes 22 and 24 each typically have a zener voltage of 200 VDC, the reflected voltage of the primary will be clamped to 400 VDC. After the primary 19 delivers the energy stored in its leakage inductance, i.e., after the voltage spike settles, the voltage across the primary 19 drops to the reflected voltage from the secondary 20. However for the short period of time when the voltage spike caused by the leakage inductance of the primary 19 occurs, the switching transistor 36 must endure very high voltages. Then, after the transformer 18 has delivered its energy to the secondary 20, the reflected voltage on the primary 19 collapses to zero.

Thus, very soon after transistor 36 turns off, the voltage at the drain of transistor 36 can be as high as 1200 VDC with respect to the reference point, which in this case is the negative power supply input rail. This is because the voltage at the drain of switching transistor, which as discussed can reach a peak of 800 VDC (the worst case input voltage) adds to the 400 VDC (the clamped spike voltage caused by the leakage inductance of the primary 19). Thus, the switching transistor 36 used in the power supply 10 of the prior art must have a drain-source breakdown voltage of greater than 1200 VDC, and preferably 1300 VDC, for proper operation and to avoid damage.

MOSFETs having such high drain-source breakdown voltages are very expensive. For example, the IRFCG20 from International Rectifier has a drain-source breakdown voltage of one thousand (1000) VDC. This product is priced at approximately three dollars. In comparison, a MOSFET having a drain-source breakdown voltage of six hundred (600) VDC such as the IRFBC20, also from International Rectifier, is priced at approximately fifty cents. Thus, there is a need for a high-voltage flyback power supply that eliminates the need for such a high cost switching transistor 36. The various embodiments of the invention of this application improve upon such prior art flyback power supplies by eliminating the need for such a high cost switching transistor, thereby reducing the cost of the power supply while maintaining the performance advantages of the prior art.

SUMMARY OF THE INVENTION

The present invention overcomes the problems and disadvantages of the prior art through a unique circuit arrangement utilizing two lower power switching transistors. One aspect of the present invention comprises a transformer comprising a primary winding, a core, and a secondary winding. One of the two transistors which is substituted for the single, very-high drain-source breakdown voltage transistor used in the prior art, and which enables the present invention to greatly reduce the cost of the power supply, has its drain connected to a first terminal of the primary. A Zener diode is connected between the gate and the source of this first transistor. A second of the transistors which is substituted for the single, very-high drain-source breakdown voltage transistor used in the prior art, has drain connected to the source of the first transistor.

A clamping circuit is in parallel circuit configuration with the primary winding of the transformer. Clamping circuit comprises at least one high breakdown voltage Zener diode and a non-Zener diode. The non-Zener diode is arranged such that when the transformer is providing its current to the secondary, the voltage spike caused by the leakage inductance of the primary can be clamped to a certain voltage by the at least one Zener diode.

A voltage divider comprising two resistors is connected to the gate of the first transistor. This voltage divider aides in placing a voltage on the gate of the first transistor upon start up of the power supply. In addition, a capacitor is connected in parallel circuit configuration with one of the resistors of the voltage divider. This capacitor stores charge which is used to turn on the first transistor when the second transistor turns on after both transistors have been turned off.

A pulse width modulation controller is connected to the gate of the second transistor which turns this second transistor on and off. The duty cycle of the pulses created by the pulse width modulation controller changes as the power demands of the load changes. Methods other than pulse width modulation may be used to control the duty cycle of the second transistor. Such methods include, but are not limited to, variable frequency control such as fixed pulse width (on-time) variable frequency control or variable pulse width (on-time) variable frequency control.

In a preferred embodiment of the invention, the high voltage power supply comprises a transformer comprising a primary winding, a core, and a secondary winding. The primary winding has a first terminal and a second terminal. The secondary winding has a first terminal and a second terminal. A first transistor comprising a gate, a source and a drain has its drain connected to the first terminal of the primary winding. A second transistor comprising a gate, a source and a drain has its drain connected to the source of the first transistor.

This preferred embodiment of the invention also comprises a first Zener diode. The first Zener diode comprises an anode terminal and a cathode terminal. The anode terminal of the first Zener diode is connected to the second terminal of the primary winding. In addition, a second Zener diode comprising an anode terminal and a cathode terminal has its anode terminal connected to the cathode terminal of the first Zener diode.

This preferred embodiment of the invention also comprises a first diode. The first diode comprises an anode terminal and a cathode terminal. The cathode terminal of the first diode is connected to the cathode terminal of the second Zener diode. The anode terminal of the first diode is connected to the drain of the first transistor.

This preferred embodiment of the invention also comprises a first resistor which comprises a first terminal and a second terminal. The first terminal of the first resistor is connected to the anode terminal of the first Zener diode. The second terminal of the first resistor is connected to the gate of the first transistor. A second resistor comprising a first terminal and a second terminal has its first terminal connected to the gate of the first transistor and its second terminal connected to the source of the second transistor.

This preferred embodiment of the invention also comprises a first capacitor comprising a first terminal and a second terminal. The first terminal of the first capacitor is connected to the gate of the first transistor and the second terminal of the first capacitor is connected to the source of the second transistor. A third Zener diode comprising an anode terminal and a cathode terminal has its anode terminal connected to the source of the first transistor and its cathode terminal connected to the gate of the first transistor.

This preferred embodiment of the invention also comprises a second diode comprising an anode terminal and a cathode terminal. The anode terminal of the second diode is connected to the first terminal of the secondary winding and its cathode terminal is connected to the output terminal of the power supply. This preferred embodiment also comprises a second capacitor having a first terminal and a second terminal. The first terminal is connected to the cathode terminal of the second diode and the second terminal is connected to the second terminal of the secondary winding.

This preferred embodiment of the invention also comprises a sense circuit having a first input from the cathode of the second diode and a second input from the second terminal of the secondary winding. A pulse width modulation controller receives inputs from the sense circuit. The output of the pulse width modulation controller is connected to the gate of the second transistor.

The above and other preferred features of the invention, including various novel details of construction and combination of components, will now be more particularly described with reference to the accompanying drawings and pointed out in the claims. It will be understood that the particular device embodying the invention are shown by way of illustration only and not as limitations of the invention. As will be obvious to those skilled in the art, the principles and features of this invention may be employed in various and numerous embodiments without departing from the scope of the invention.

BRIEF DESCRIPTION OF THE DRAWINGS

Reference is made to the accompanying drawings in which are shown illustrative embodiments of aspects of the invention, from which novel features and advantages will be apparent.

DETAILED DESCRIPTION OF THE DRAWINGS

Figure 1:
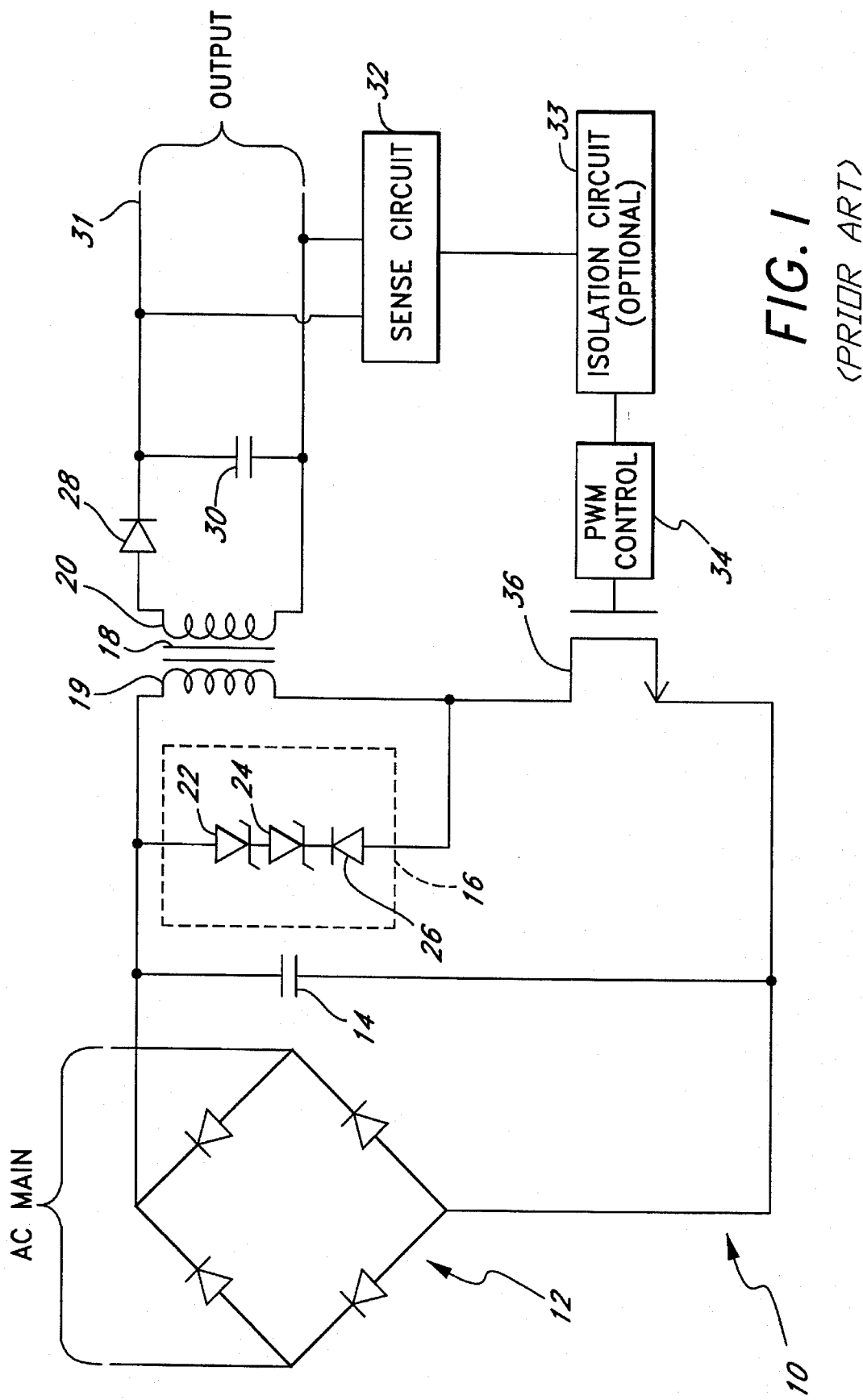
FIG. 1 is a schematic diagram of a high voltage flyback power supply of the prior art.
Figure 2:
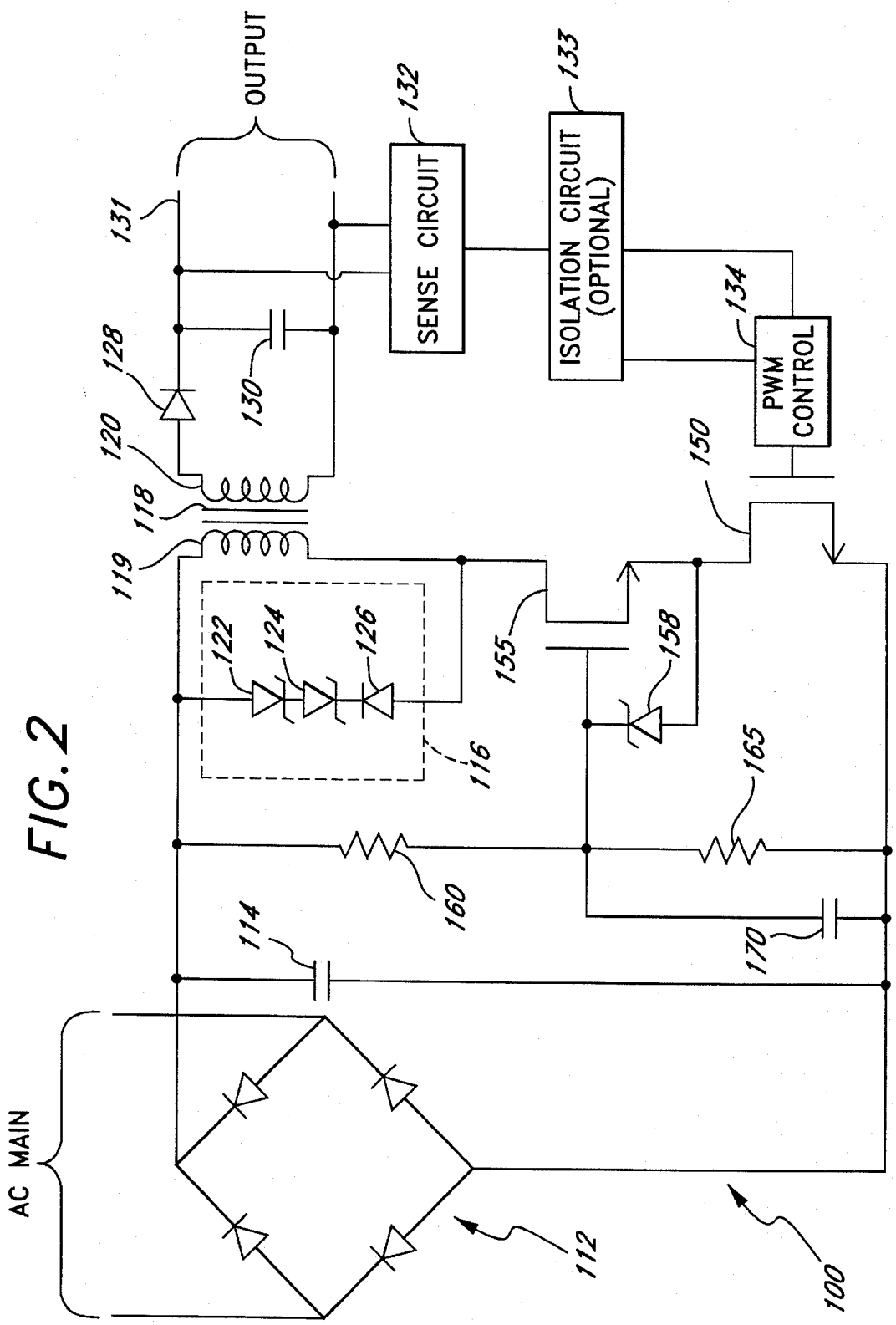
FIG. 2 is a schematic diagram of an embodiment of the high voltage flyback power supply of the present invention.

With reference to FIG. 2, a schematic diagram of a high voltage flyback power supply 100 incorporating aspects of the present invention is shown. As in the prior art, the main 440 VAC input is rectified and filtered by a bridge 112 and capacitor 114. This rectifying and filtering results in a nominal 625 VDC input voltage. However, as discussed above, due to line fluctuations and transients common in industrial applications, the input voltage can reach as high as 800 VDC. Power supply 100 comprises clamping circuit 116, which comprises Zener diodes 122 and 124 and diode 126. In a preferred embodiment, each Zener diode 122 and 124 typically have a zener voltage of 200 volts. Clamping circuit 116 is used to limit the sum of the reflected voltage of the primary and the voltage spike caused by the inherent leakage inductance of the primary winding 119 of the output transformer 118 to a certain voltage. This reflected voltage and voltage spike will be discussed below. Secondary winding 120 is connected to diode 128 and capacitor 130 in series circuit configuration. The output 131 of the power supply 100 is across capacitor 130.

The output 131 is connected to a sense circuit 132. The output of sense circuit 132 can be connected to the input of an isolation circuit 133. Isolation circuit 133 is only present in those power supplies 100 where output 131 needs to be isolated from the AC main. If an isolation circuit 133 is present, its output is connected to a pulse width modulation controller 134. If an isolation circuit 133 is not present, the output of the sense circuit 132 is connected to the pulse width modulation controller 134. The output of the pulse width modulation controller 134 is connected to the gate of transistor 150, which is a n-type MOSFET. Transistor 150 is connected to transistor 155, which also a n-type MOSFET, in cascode arrangement such that the drain of transistor 150 is connected to the source of transistor 155. The source of transistor 155 is connected to its gate by Zener diode 158. The gate of transistor 155 is connected to a second terminal of resistor 160, a first terminal of resistor 165, and first terminal of capacitor 170. Resistor 165 and capacitor 170 are arranged in parallel circuit configuration such that a second terminal of resistor 165 and a second terminal of capacitor 170 are connected to the negative DC rail. A second terminal of resistor 160 is connected to the positive DC rail. Resistors 160 and 165 form a voltage divider.

The operation of the circuit shown in FIG. 2 will now be described. When the power supply 100 is first turned on, the rectified and filtered power from the AC main supply is provided to a first terminal of resistor 160. As discussed, resistors 160 and 165 form a voltage divider. In a preferred embodiment, the resistance values of resistors 160 and 165 are selected such that transistor 155 is biased between one-third to one-half of the input voltage. For example, resistor 160 could have a resistance of 2MΩ and resistor 165 could have a resistance of 1MΩ. Voltage must be placed on the gate of transistor 155 at start up because if its gate is left floating, transistor 155 will never turn on. Further, upon start up, capacitor 170 will charge. In a preferred embodiment, capacitor 170 is selected to have two hundred and seventy (270) picoFarads of capacitance. Capacitor 170 will charge to approximately 200 VDC upon start up. Further, when voltage is placed on the gate of transistor 155, the voltage at its source will be equal to approximately the gate voltage minus the threshold voltage of transistor 155.

Also immediately upon start up, pulse width modulation controller 134 will receive power. Generally, power is provided to pulse width modulation controller 134 directly from the positive input high voltage rail or from the drain voltage of transistor 150. As soon as pulse width modulation controller 134 receives power, it begins switching transistor 150 on and off. When transistor 150 turns on, i.e., when pulse width modulation controller places voltage on the gate of transistor 150, its drain will be shorted to the negative rail. When this occurs, the gate of transistor 155 draws current from capacitor 170 into the inherent-gate capacitance of transistor 155', thereby charging the gate capacitance to the breakdown voltage of Zener diode 158. In a preferred embodiment, Zener diode 158 is selected to have a breakdown voltage of fifteen volts. This causes the transistor 155 to turn on. It is noted that the gate of transistor 155 will attempt to stay at a voltage higher than the voltage of the negative rail by the breakdown voltage of Zener diode 158 because of the charge stored in the gate capacitance of transistor 155. It is important that the gate voltage of transistor 155 not exceed the voltage of the source by more than fifteen volts. Otherwise, damage to transistor 155 could result. Zener diode 158 is used for this purpose, as it is selected such that if the gate voltage of transistor 155 exceeds the source voltage of transistor 155 by more than fifteen volts, the Zener breakdown voltage is reached, and the voltage is clamped at fifteen volts.

At this point in the operation of power supply 100, both transistors 150 and 155 are turned on. When pulse width modulation controller 134 turns transistor 150 off, the drain and the source of transistor 150 are essentially an open circuit, which causes the drain-source current ("$I_{DS}$") through transistor 150 to become zero. When the drain-source current through transistor 150 is zero, the drain-source current through transistor 155 becomes zero as well, and transistor 155 turns off. This causes the drain of transistor 155 to be pulled to a voltage above the positive power supply rail. This is caused by the inductance of the primary 119. When the voltage on the primary 119 reaches the reflected voltage, the energy in the transformer 118 is delivered to the secondary 120. When the energy is being delivered to the secondary 120, the voltage at the drain of transistor 155 is the reflected voltage at the primary 119 plus the input voltage. As in the prior art, the magnitude of the reflected voltage is controlled by adjusting the winding ratio of the transformer 119, i.e., the ratio of the number of windings in the primary 119 versus the number of windings in the secondary 120. The winding ratio of the transformer 119 in a preferred embodiment is selected such that the reflected voltage of the primary 119 is limited to approximately 300 VDC.

As in the prior art, however, the inherent leakage inductance of the primary 119, which causes additional current to flow through diode 126, results in a voltage spike which adds to the reflected voltage from the primary. Thus, the reflected voltage combined with the voltage spike from the leakage inductance of the primary 119 can rise well above 300 VDC for a short period of time. The current through diode 126, which becomes forward biased, causes Zener diodes 122 and 124 to reverse bias. If the reflected voltage combined with the voltage spike from the leakage inductance becomes high enough, Zener diodes 122 and 124 will enter their breakdown region. The leakage inductance of the primary 119 can place Zener diodes 122 and 124 in their breakdown region. Since Zener diodes 122 and 124 each typically have a zener voltage of 200 VDC, the reflected voltage plus the voltage spike from the leakage inductance of the primary 119 will be clamped to 400 VDC.

The voltage spike caused by the leakage inductance of the primary will dissipate over a short period of time. After the leakage inductance energy is delivered to the clamping circuit 116, the primary voltage will drop to the reflected voltage, which in a preferred embodiment is 300 VDC. Further, after the primary 119 delivers its current to the secondary 120, the reflected voltage collapses. However, for the short period of time when the voltage spike caused by the primary's 119 leakage inductance occurs, the voltage on the drain of transistor 155 can reach a peak of 800 VDC (the worst case input voltage) plus 400 VDC (the clamped spike voltage caused by the leakage inductance of the primary 119), which is a total of 1200 VDC with respect to the reference point, which in this case is the negative power supply input rail.

In a preferred embodiment of the invention, transistor 155 has a drain-source breakdown voltage of approximately 600 VDC. When this transistor 155 turns off, the voltage on its drain will rapidly increase. When it reaches 600 VDC, transistor 155 will breakdown. The avalanche current caused by the breakdown voltage will pull the source and the gate (through the forward biased Zener diode 158) of transistor 155 to a voltage that is 600 VDC below its drain voltage. Therefore, the drain of transistor 150 will see a voltage that is equal to drain voltage of transistor 155, which is that transistor's breakdown voltage, i.e., 600 volts. Transistor 150, therefore, must have a breakdown voltage in excess of 600 VDC, and preferably 700 VDC, for proper operation and to avoid damage.

In addition to pulling the drain voltage of transistor 150 to the drain voltage of transistor 155, the avalanche current of through transistor 155 will charge capacitor 170 to a voltage that is one diode drop (i.e., the diode drop of forward biased Zener diode 158) less than the voltage on the drain of transistor 150. As will now be seen, charging capacitor 170 allows transistor 155 to turn on again when transistor 150 is turned on by pulse width modulation controller 134. When transistor 150 turns on, as discussed, the source of transistor 155 is pulled to the negative power rail. If there is no voltage placed on the gate of transistor 155, it will not turn on again, regardless of whether transistor 150 is turned on, thereby rendering the power supply 100 inoperable. It is the charge stored in capacitor 170 that charges the gate capacitance of transistor 155 to a voltage that allows it to turn on again when transistor 150 turns on. In order for transistor 155 to turn on, the gate voltage of transistor 155 must be larger than its source voltage plus its source-to-gate turn-on threshold voltage. Even if transistor 155 does not breakdown, capacitor 170 will be charged by the resistor 160 (as discussed, resistors 160 and 165 form a voltage divider) sufficiently to allow transistor 155 to turn on in the next cycle.

In a preferred embodiment of the present invention, transistor 150 and pulse width modulation controller 134 can be implemented by using a single integrated circuit 200 embodying both components. An example of such a circuit is the TOP200 from Power Integrations, Inc., which is the assignee of the present invention. The cost of such an integrated circuit is approximately one dollar and fifty cents. The TOP200 incorporates a pulse width modulation controller 134 and a transistor 150 having a breakdown voltage of 700 VDC. There are currently no integrated circuits incorporating a pulse width modulation controller and a switching transistor with a breakdown voltage of 1300 volts, as manufacture of such a device would be extremely difficult. Thus, the cost benefits of using such an integrated circuit cannot be realized using the power supply 10 of the prior art.

Thus, in a power supply 100 utilizing the teachings of the present invention, the cost of the transistors 150 and 155 and the pulse width modulation controller 134 would be approximately two dollars (i.e., one dollar fifty cents for the TOP200 and fifty cents for the 600 V transistor 155). In contrast, in a power supply 10 of the prior art, a switching transistor 36, which as discussed costs approximately three dollars, and a suitable pulse width modulation controller 34, which costs approximately seventy-five cents, are required. This results in a cost of three dollars and seventy-five cents. Thus, the present invention reduces the cost of the critical components by nearly fifty percent.

Thus, a low-cost, high-voltage, flyback power supply is disclosed. While embodiments and applications of this invention have been shown and described, it would be apparent to those skilled in the art that many more modifications are possible without departing from the inventive concepts herein. The invention, therefore is not to be restricted except in accordance with the scope of the appended claims.

I claim:

1. A power supply comprising:

a transformer comprising a primary winding, a core, and a secondary winding, said primary winding having a first terminal and a second terminal and said secondary winding having a first terminal and a second terminal;

a first transistor, said first transistor comprising a gate, a source and a drain, said first transistor having said drain connected to said first terminal of said primary winding;

a second transistor, said second transistor comprising a gate, a source and a drain, said second transistor having its drain connected to said source of said first transistor;

a first Zener diode, said first Zener diode comprising an anode terminal and a cathode terminal, said anode terminal of said first Zener diode connected to said second terminal of said primary winding;

a second Zener diode, said second Zener diode comprising an anode terminal and a cathode terminal, said anode terminal of said second Zener diode connected to said cathode terminal of said first Zener diode;

a first diode, said first diode comprising an anode terminal and a cathode terminal, said cathode terminal of said first diode connected to said cathode terminal of said second Zener diode and said anode terminal of said first diode connected to said drain of said first transistor;

a first resistor, said first resistor comprising a first terminal and a second terminal, said first terminal of said first resistor connected to said anode terminal of said first Zener diode, said second terminal of said first resistor connected to said gate of said first transistor;

a second resistor, said second resistor comprising a first terminal and a second terminal, said first terminal connected to the gate of said first transistor and said second terminal connected to said source of second transistor;

a first capacitor, said capacitor comprising a first terminal and a second terminal, said first terminal of said first capacitor connected to said gate of said first transistor and said second terminal connected to said source of said second transistor;

a third Zener diode, said third Zener diode comprising an anode terminal and a cathode terminal, said anode terminal of said third Zener diode connected to said source of said first transistor and said cathode terminal of said third Zener diode connected to said gate of said first transistor;

a second diode, said second diode having an anode terminal and a cathode terminal, said anode terminal of said second diode connected to said first terminal of said secondary winding;

a second capacitor, said second capacitor having a first terminal and a second terminal, said first terminal of said second capacitor connected to said cathode terminal of said second diode and said second terminal of said second capacitor connected to said second terminal of said secondary winding;

a sense circuit having a first input from a said cathode of said second diode and a second input from said second terminal of said secondary winding; and a pulse width modulation controller, said pulse width modulation controller receiving inputs from said sense circuit, said output of said pulse width modulation controller connected to said gate of said second transistor.

2. The power supply of claim 1 wherein said sense circuit is connected to said pulse width modulation controller by an isolation circuit.

3. The power supply of claim 1 wherein said primary winding and said secondary winding have a turns ratio adapted to cause reflected voltage from the secondary winding onto the primary winding to be approximately three hundred volts.

4. The power supply of claim 3 wherein said first Zener diode and said second Zener diode each have a breakdown voltage of approximately two hundred volts.

5. The power supply of claim 4 when said first transistor has a drain-source breakdown voltage of at least six hundred volts.

6. The power supply of claim 5 wherein said second transistor has a drain-source breakdown voltage of at least six hundred volts.

7. The power supply of claim 6 wherein said pulse width modulation controller and said second transistor are fabricated on a single integrated circuit.

8. The power supply of claim 7 wherein the drain-source breakdown voltage of said second transistor is at least six hundred volts.

9. The power supply of claim 1 wherein all of the connections are electrical connections.

10. A power supply comprising:

a transformer comprising a primary winding and a secondary winding;

a clamping circuit in parallel with said primary;

a first transistor having its drain connected to said primary, its gate connected to a voltage divider, a capacitor and the cathode terminal of a Zener diode, and its source connected to the anode of said Zener diode; and a second transistor having its drain connected to said source of said first transistor.

11. The power supply of claim 10 wherein said first transistor has a drain-source breakdown voltage of at least six hundred volts and said second transistor has a drain-source breakdown voltage of at least six hundred volts.

12. The power supply of claim 10 further comprising a pulse width modulation controller in electrical communication with the gate of said second transistor.

13. The power supply of claim 12 wherein said second transistor and said pulse width modulation controller are fabricated on a single integrated circuit.

14. A power supply comprising:

a transformer comprising a primary winding and a secondary winding;

a clamping circuit connected in parallel across said primary winding;

a first transistor and a second transistor, said first and second transistors in cascode arrangement, said first transistor arranged such that its drain is connected to said primary winding and said second transistor arranged such that its source is connected to a negative power supply input rail;

a Zener diode, said Zener diode arranged with its cathode connected to the gate of a first of said transistor and its anode connected to the source of said first transistor;

A voltage divider comprising a first resistor and a second resistor, said voltage divider connected between a positive power supply input rail and the source of said second transistor, the gate of said first transistor connected to said voltage divider;

a capacitor connected between the gate of said first transistor and said negative power supply input rail; and a pulse width modulation controller connected to the gate of said second transistor.

15. The power supply of claim 14 wherein said second transistor and said pulse width modulation controller are fabricated as a single integrated circuit.

* * * * *